Oct. 22, 1929.    G. FLINTERMANN    1,732,646
JOINT
Filed April 28, 1927    3 Sheets-Sheet 2
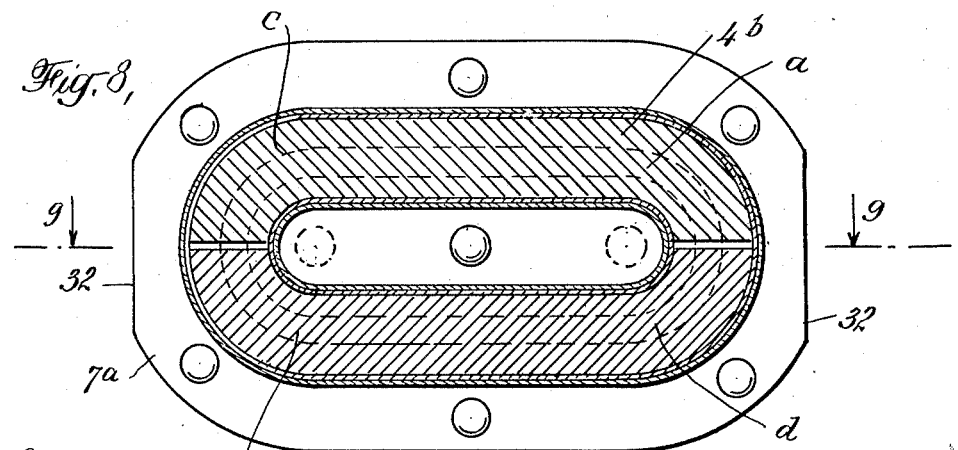
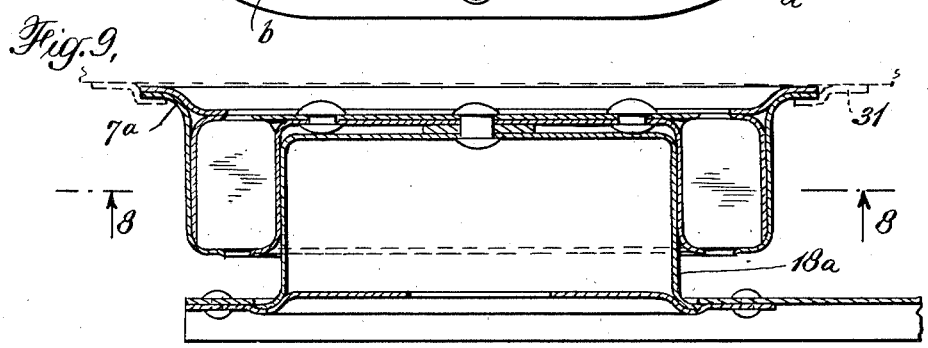
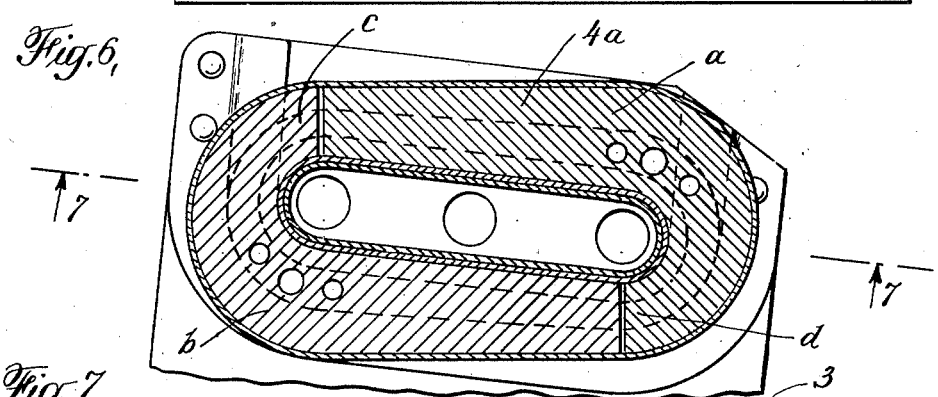
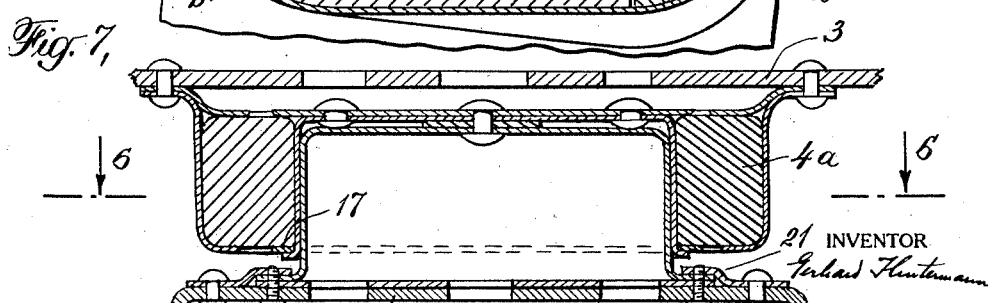
INVENTOR
Gerhard Flintermann
ATTORNEYS

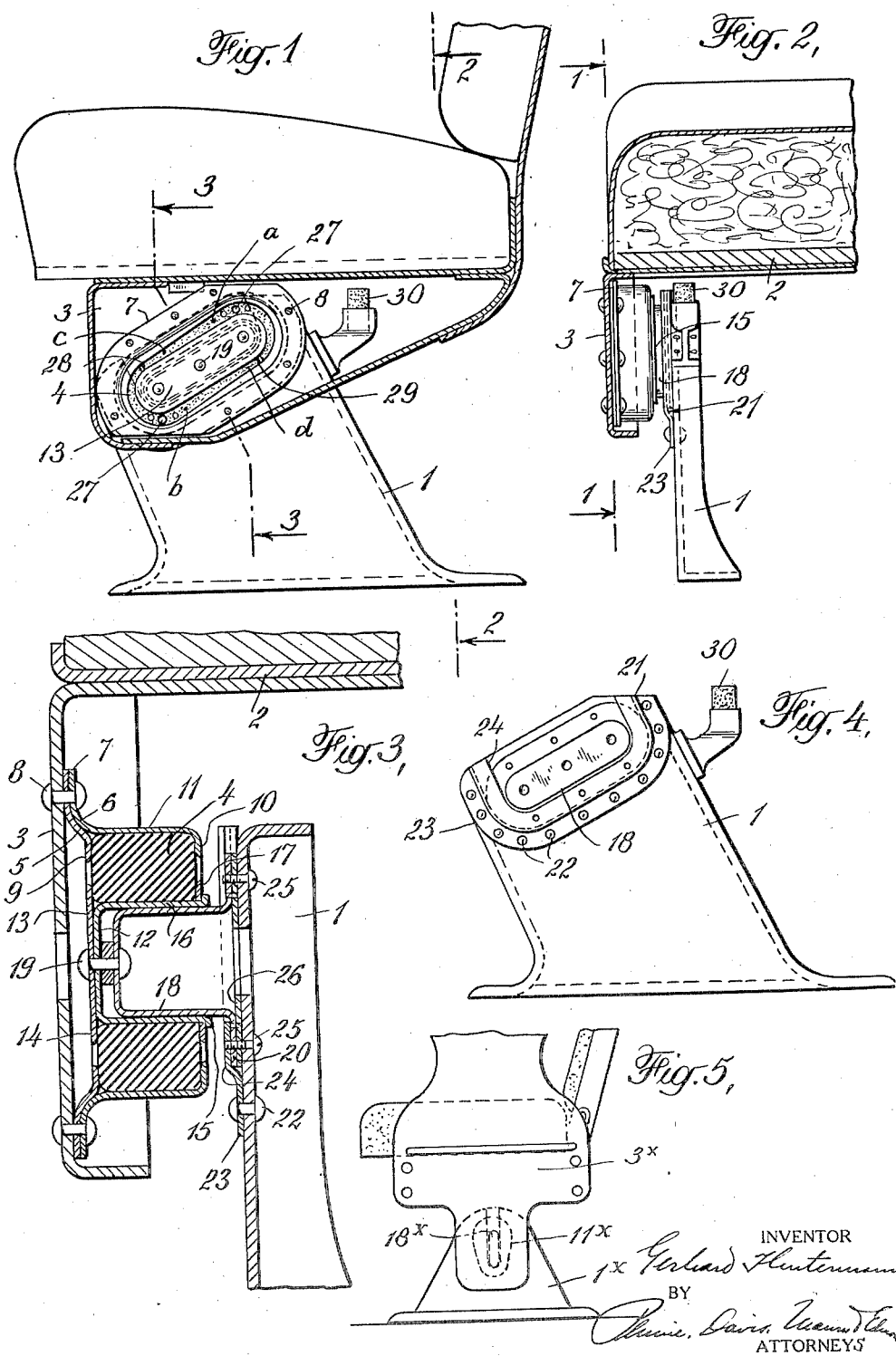

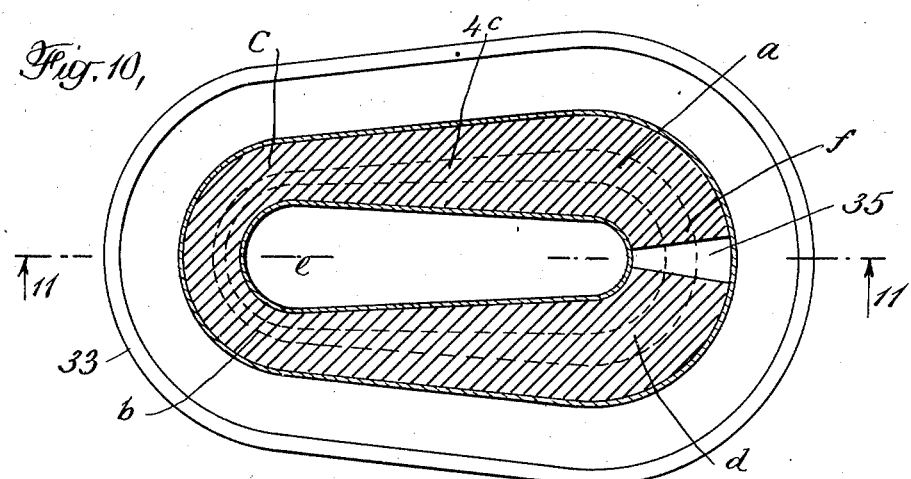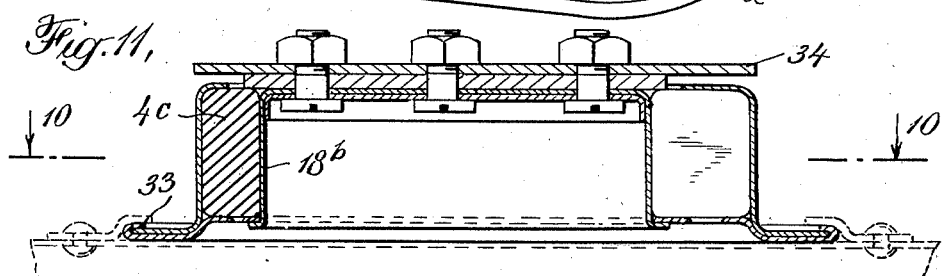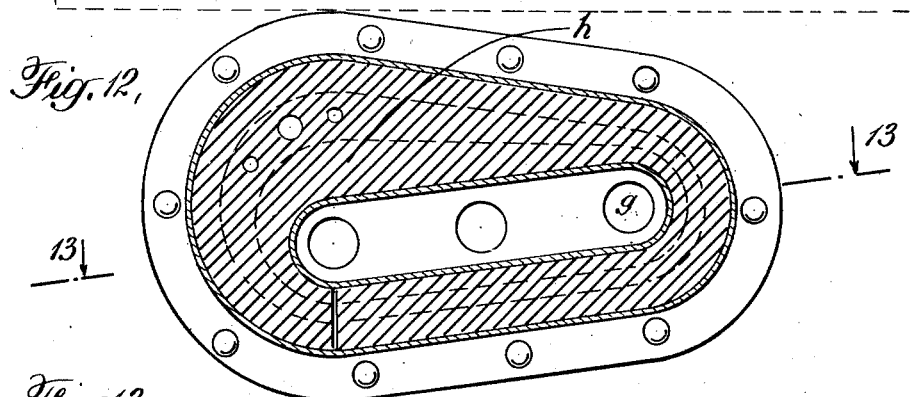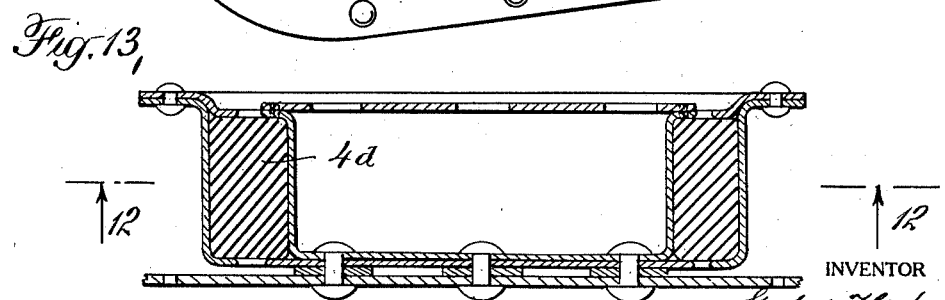

Patented Oct. 22, 1929

1,732,646

UNITED STATES PATENT OFFICE

GERHARD FLINTERMANN, OF ORANGE, NEW JERSEY

JOINT

Application filed April 28, 1927. Serial No. 187,156.

This invention relates to flexible joints of the type in which the movement between two relatively movable members is yieldingly resisted by an interposed body of resilient material.

One of the objects of the invention is to provide a flexible joint of this character which is inexpensive to manufacture as most of its parts may be made from drawn or pressed sheet metal.

Another object of the invention is to provide a flexible joint of the above-mentioned character having a peculiar configuration such that the compressing action of the resilient material between the two relatively movable members may be extended over a considerable area.

A further object is to provide a flexible joint of the kind mentioned in which the resilient material is massed to a greater degree at certain places to increase the flexibility at those places thereby either permitting or causing a greater amount of movement between the parts of the joint at those places.

Another object is to provide a flexible joint in which a body of resilient material located between two members is tapered in an improved manner so that the load or shocks transmitted to the resilient material by the members is gradually absorbed by the resilient material.

It is also an object of the invention to provide an improved form of flexible joint for yieldingly or resiliently supporting the seats of railway cars, automobiles, busses, trucks, theatres and the like, but which is capable of many other uses because it is so readily adaptable to various requirements.

The accompanying drawings illustrate several of a number of different forms the improved flexible joint may take and also show one of the many uses to which it may be put.

In the drawings:—

Fig. 1 is a transverse section of a seat provided with the improved flexible joint, the section being taken on line 1—1 of Fig. 2.

Fig. 2 is a partial longitudinal section taken on the line 2—2 of Fig. 1.

Fig. 3 is a partial longitudinal section taken on the line 3—3 of Fig. 1;

Fig. 4 is a side view of one of the seat standards showing how one of the joint members may be connected with it;

Fig. 5 is a more or less diagrammatic view showing how the joint may be adapted for use in a reversible seat;

Figs. 6 and 7 are longitudinal sections of the type of joint illustrated in Figs. 1 to 4 inclusive, the section of Fig. 6 being taken on the line 6—6 of Fig. 7 and the section of Fig. 7 being taken on the line 7—7 of Fig. 6;

Figs. 8 and 9 are longitudinal sections of the type of joint which may be used to fulfil requirements such as exemplified by Fig. 5, the section of Fig. 8 being taken on the line 8—8 of Fig. 9 and the section of Fig. 9 being taken on the line 9—9 of Fig. 8;

Figs. 10 and 11 are longitudinal sections of a modified form of flexible joint, the section of Fig. 10 being taken on the line 10—10 of Fig. 11, and the section of Fig. 11 being taken on the line 11—11 of Fig. 10;

Figs. 12 and 13 are longitudinal sections of a still further modified form of joint, the section of Fig. 12 being taken on the line 12—12 of Fig. 13, and the section of Fig. 13 being taken on the line 13—13 of Fig. 12.

The chair seat and its joint shown in Figs. 1 to 5 inclusive will first be described because with a particular use of the joint kept in mind, the remaining figures will be more readily understood. In this application the chair seat is illustrated merely to show one use to which the improved joint may be placed. The particular seat shown in Figs. 1 to 4 inclusive has a standard 1 located at each end of the seat. Only one of the standards appears in the drawings but it will be understood that the parts shown at one end of the seat in the drawings may be duplicated for the other end. The bottom 2 of the seat at each end has a bracket or web 3 which may be of sheet metal and one of the flexible joints is interposed between each of the brackets 3 and the corresponding standard 1. One part of the flexible joint is shown connected to the web 3 and the other part to the standard 1, but obviously the seat may be supported by the joint in many other ways.

The body of resilient material 4, located between the two members of the joint, may be made of rubber, leather or the like. It has the form of a flattened or elongated annulus as shown in Fig. 1. The outermost member of the joint is secured to the web or bracket 3 and engages the outer portion of the annulus of resilient material and the innermost member of the joint is secured to the standard 1 and engages the inner portion of the annulus.

The inner and outer members of the joint are preferably made of sheet metal. The outer member, for convenience, may be made of two plates 5 and 6, so shaped and assembled that the resulting composite structure has a flange 7 which may be riveted to the seat bracket 3 as shown at 8, and also has side flanges 9 and 10 and an intervening wall or web 11, the three of which form an annular seat or channel for receiving and gripping the outer edge portion of the body of resilient material.

The inner edge of the annulus of resilient material is received and gripped by two sheet metal plates 12 and 13 riveted together and so shaped as to provide side flanges 14 and 15 and an intervening wall or web 16. The web 16 fits the central opening in the annulus of resilient material and the side flanges 14 and 15 together with the web 16 form an annular channel which grips and holds the inner edge portion of the resilient material. If desired a washer or ring 17 may be interposed between the flange 15 and the body of resilient material. The composite metal member formed as just described may be conveniently fastened to the standard 1. The opening in the composite inner member 12—13 receives the closed end of a stamped or drawn elongated cup-shaped metal part 18.

The closed end of the cup-shaped part 18 may be riveted to the plates 12 and 13 as shown at 19. The open end of the cup-shaped part has a flange 20 which is adapted to slip sidewise into a pocket 21 riveted to the standard 1 as shown at 22. Fig. 4 shows the cup-shaped part 18 separated from the rest of the joint and makes it clear how its flange 20 is received by the pocket 21. The shape of the pocket 21 is also made clear by this figure. It may simply be a substantially U-shaped strip of metal having a flange 23 which may be riveted to the standard as just described and having an off-set pocket-like portion 24 to receive the flange 20 of the cup member 18. If desired screws 25 may be employed as semi-permanent means for more securely holding the cup-shaped member in the pocket. These screws may pass through the flange of the cup-shaped member and through the wall of the pocket as shown in Fig. 3. If desired a shim 26 may be located in the pocket between the flange 20 of the cup-shaped member and the standard 1.

An entire joint may be secured to each of the brackets 3 of the seat and then the seat may be mounted on the standards simply by inserting the flanges 20 of the cup-shaped members 18 into the pocket members 21 on the standards, and then applying the screws 25. When the screws 25 are removed the seat may be readily separated from the standards and the parts of the joint inspected or repaired.

It is preferable to have the major axis of the joint inclined as shown in Fig. 1 and it is desirable to have the joint located with respect to the front and back of the seat, in about the position shown in Fig. 1. Under these circumstances the bracket 3 acts as a lever arm to transmit the tilting load to the joint and the load will be properly distributed to the resilient material and the opposing faces of the joint will be in the proper positions to handle the load effectively.

The body of resilient material allows vertical movement of the seat with respect to the standards and it also allows pivotal or tilting movement. The chair seat, when occupied, will tend to pivot or tilt around the center of the joint. The outer member will move with the bracket 3 and the inner member will remain stationary. When the seat tilts backwardly the resilient material will be compressed in the vicinity of the points marked $a$ and $b$. The resilient material near these places may be provided with openings 27 to make it more compressible and permit the material to flow. In view of the fact that the greatest relative movement between the two parts of the joint will take place near the points $a$ and $b$ the edges of the flanges 14 and 15 are shown farther from the edges of the flanges 9 and 10 at these points than at points $c$ and $d$.

When rubber is used as the resilient material there is considerably less rebound than if springs were used to resiliently support the seat.

The annulus of resilient material may be divided into several portions if so desired as shown at 28 and 29.

A rubber stop 30 may yieldingly limit the backward tilting movement of the seat.

In a seat with a reversible back such as formed in some railway cars, it may be advisable to arrange the joint on end as shown in Fig. 5. In this figure the inner member 18× of the joint is fastened to the side of the seat $3^x$ and the outer member $11^x$ is fastened to the standard $1^x$. In this way the vertical load compresses the resilient material at the lower end of the joint. When the seat tilts it fulcrums about an axis near the lower end of the joint and the maximum compression of the resilient material caused by the tilting action of the seat takes place near the top of the joint and at either one side or the other depending upon the direction in which the seat tilts. The resilient material may be made thicker near these places as shown in Fig. 5 and as will be more fully described in connection with Fig. 10.

It will now be seen that the elongated shape of the joint enables a cushioning action to be obtained over a large area. Furthermore, the flat nature of the joint causes it to occupy much less space than a circular joint and thus is one of the things that makes the joint especially adapted for use in a seat of the kind described. It may be located directly under the seat and no foot room is sacrificed. However, in spite of the small space occupied by the joint, a large amount of cushioning is obtained.

In Figs. 6 and 7 the joint is constructed in the same way except that the resilient material $4^a$ is thicker near the points $a$ and $b$ than at $c$ and $d$. The joint shown in these figures is intended to be so positioned that the maximum compression will occur in the vicinity of the points $a$ and $b$. The joint of Figs. 1 to 4 inclusive might advantageously be of the type shown in Figs. 6 and 7. Another advantage of the type of joint shown in Figs. 6 and 7 is that as the outer member pivots around in the direction of the arrow the resistance offered by the body of resilient material is gradually increased and the shock is gradually absorbed. The more the pressure increases at the thick end of the resilient material the more resistance it will offer.

In Figs. 8 and 9 the annulus of resilient material $4^b$ is of uniform thickness. This type of joint may be advantageously used wherever the pivoting action of one of the members causes about the same relative movement between the parts of the joint near the points $a$ and $b$ as near the points $c$ and $d$ or wherever it is desired to control the pivoting action so that the kind of movement just mentioned will take place. The metal parts of the joint shown in these figures are constructed in a slightly different way to show possible variations. The flange $7^a$ of the outer member may be received by a pocket member 31 secured to the chair seat or any part to which the joint is to be conencted, and the flange $7^a$ may have flattened portions 32 to prevent turning or tilting of the outside member in its pocket. The flange on the cup-shaped inner member $18^a$ may be received in a pocket formed in the standard, or any other member $1^a$ in the manner shown in Fig. 9.

In Figs. 10 and 11 the body of resilient material $4^c$ is so shaped that the portions in the vicinity of points $a$ and $d$ are thicker than in the vicinity of points $b$ and $c$. In other words there are two thickened portions on opposite sides of the same end of the joint. This type of joint may be advantageously used in relations where the pivoting action of one of the members takes place in both directions about an axis somewhere near the point marked $e$ or where it is desired to control the pivoting action so that this kind of movement will take place. Under these circumstances the greatest amount of compression of the resilient material would take place near $a$ for one direction of movement and near $d$ for the other direction of movement. This joint is of the type represented in Fig. 5 and is well adapted for use in a reversible seat such as shown in that figure. This type of joint may also be used in such a way that the greatest load comes at the end of the joint marked $f$ because the resilient material is thickest at that end. In Figs. 10 and 11 the outer members are crimped together as shown at 33 instead of being riveted together. The inner cup-shaped member $18^b$ instead of being connected at its open end to some member, such as the standard 1, is bolted at its closed end to a member 34 and the outer member is received by a pocket formed on some member at the other side of the joint as shown in dotted lines. Instead of the resilient material being split at two places it may be split at only one place as shown at 35.

Figs 12 and 13 show how the body of resilient material $14^d$ may be shaped if the movement of either member tends to be, or is to be controlled so that it will be around an axis located near $g$ and in one direction only, that is, the inner member moves clockwise (in Fig. 12) about the axis $g$ or the outer member moves anti-clockwise about this axis. The greatest compression will always then come near $h$ and this is the only place where it is necessary to have the resilient material thickened. In these figures the inner and outer members may be connected in any suitable way at either one or both sides of each member to the parts between which the joint is to be located.

The improved flexible joint may be used for many purposes, not only for seats, as illustrated in Figs 1 to 5 inclusive, but also for electric light supports, bed spring supports, shock absorbers, flexible couplings, etc. While the joint is especially designed for use in connection with non-rotary parts it may also be used as a coupling between rotary shaft sections.

The main metallic parts of the joint are of such a nature that they may be made of pressed or drawn metal thus lessening the cost of manufacture.

In the preferred form of the joint the inner and outer members are composite. The outer member has two portions 5 and 6 (see for instance Fig. 3) and the portion 5 partly telescopes within the portion 6. This results in an inward bulge to the plate 5 which reinforces it against the outward pressure exerted by the resilient material. The inner member has two portions 12 and 13 which together form a ring-like member adjacent the resilient material and in most of the forms illustrated also has a cup-like portion 18 (see for instance Fig. 3) which telescopes within the ring-like portion and reinforces it, assists in maintaining its shape and also serves in the particular forms shown in the drawings as means for attaching the inner member to some element such as the standard 1 of the seat.

The elongated shape of the joint enables a maximum cushioning effect to be obtained in a small space and the cushioning effect is distributed over a large area. The enlarged portions of the resilient material provide greater flexibility at the places where the enlargements occur. The joint lends itself well for different uses as the resilient material may be so shaped that the greatest thickness will come where it is most needed or where it will cause the kind of movement desired. The elongated tapered section of resilient material also has the following advantage. If a block of rubber occupying a relatively small area between two approaching surfaces is subjected to a load or shock of sufficient magnitude the resilient material will be immediately compressed to its maximum extent and there will be no resiliency left within it to cushion an additional load or shock. When the resilient material is elongated and tapered the same initial load or shock will be gradually absorbed and resisted to a greater degree and the resilient material will not immediately reach its condition of maximum compression, but will have additional reserve resiliency for further shocks and loads. For this reason also the joint adapts itself to the static load and at the same time possesses additional resiliency to take care of additional loads and shocks. While I do not wish to confine myself to any particular theory as to just why the action above described takes place, I believe it to be due to the fact that when the metal surfaces approach each other and compress the tapered elongated section of resilient rubber, the rubber tends to flow toward the thin end, but its resistance to flow in this direction is progressively increased by the converging space between the metal surfaces. The narrowest space between the metal surfaces therefore acts somewhat as a valve or constricted opening, and this valve or opening, together with the body of resilient material in advance of it (which tends to flow toward and through the restricted opening) act as a retarder and cause a less and more gradual compression of the rubber than if the rubber were not tapered or if the resilient material consisted of nothing more than that portion at the thick end.

The elongated annulus of resilient material makes the joint especially adapted for supporting a load which has its maximum effect at a distance from the center of the joint. As stated above the bracket 3 on the seat acts as a lever arm. It is in effect an element rigidly secured to one member of the joint and extends beyond the center of the joint in the direction of one of the radii of the annulus, as distinguished from a direction which is parallel with the axis of the annulus. This element extends to a point or position where the load is concentrated. Under these circumstances the load is acting on the joint through a lever arm, and while the joint must yield to perform its function of a resilient support or connection, nevertheless, it must also yieldingly oppose the action of the load transmitted through the lever arm. By giving the annulus of resilient material an elongated shape the joint may be made small and compact because when the annulus of resilient material is elongated the lever action is more effectively opposed (in a yielding manner) and the load is more effectively supported than would be the case if the body of resilient material were not elongated.

The terms "annulus" and "elongated annulus" are used herein to refer to a substantially ring shaped body or an elongated or flattened ring, that is, one which has greater length than width. The annulus need not be a continuous one for in some cases it may be desirable to make it of several sections or of one section with a gap between the ends as shown in the drawings. The length of the gap will depend upon how much the presence of the rubber at this point will be missed so far as the efficiency of the joint is concerned. In other words, if the gap or gaps occur at points where the presence of rubber is not necessary for the efficient operation of the joint, the gap or gaps may be wider at these places. For instance, the joint shown in Fig. 10 has a relatively wide gap at 35 and when this type of joint is used in the relation shown in Fig. 5, the presence of the rubber at point 35 will not be seriously missed and for this reason the gap may be made wider. Such a ring like body of resilient material having one or more gaps, either short or long, I consider as an annulus, or an elongated annulus, if it is so far complete as to perform substantially the same function in the joint as a complete or continuous annulus.

I claim:

1. A flexible joint comprising a body of resilient material having a central opening, an outer sheet metal member having side flanges and an interconnecting web rigidly associated with the side flanges and forming therewith an annular channel for receiving and gripping the outer edge portion of the resilient material, an inner sheet metal member having side flanges and an interconnecting web rigidly associated with the side flanges and forming therewith an annular channel for receiving and gripping the inner edge portion of the resilient material, and means whereby said members may be attached to the parts to be interconnected by the flexible joint.

2. A flexible joint in accordance with claim 1 in which the interconnecting webs on the inner and outer members form bottoms for the channels which are flat in a transverse direction.

3. A flexible joint in accordance with claim 1 in which the web of the inner member forms a part of a cup-shaped element, the side flanges being formed respectively at the open end of the cup-shaped member and by a plate secured to the bottom of the cup-shaped member.

4. A flexible joint comprising an elongated annulus of resilient material, a metal member engaging the outer edge portion of the resilient material and a metal member engaging the inner edge portion of the resilient material, the resilient material being substantially quadrilateral in cross-section and being at least partially unconfined by the metal members along at least one of its lateral faces, at least one of said members adapted to move relative to the other the relative movement being yieldingly resisted by the resilient material.

5. A flexible joint comprising an elongated annulus of resilient material, a metal member engaging the outer edge portion of the resilient material and a metal member having a portion extending into the opening of said elongated annulus for engaging the inner edge portion of the resilient material, the resilient material being substantially quadrilateral in cross-section and being at least partially unconfined by the metal members along at least one of its lateral faces.

6. A flexible joint comprising an elongated annulus of resilient material, a metal member having an annular channel for receiving and gripping the outer edge portion of the resilient material and a metal member having an annual channel for receiving and gripping the inner edge portion of the resilient material.

7. A flexible joint in accordance with claim 6 in which a portion rigidly associated with the inner member projects laterally from the point in a direction parallel with the axis of the opening in the resilient material and is adapted to be rigidly secured to one of the parts to be interconnected by the flexible joint.

8. A flexible joint comprising an inner member and an outer member the space between the opposing faces of said members having the shape of an elongated annulus, and resilient material substantially filling said space between the members, said resilient material being of non-uniform thickness.

9. A flexible joint in accordance with claim 8 in which the non-uniformity in the thickness of the resilient material is such that the resilient material of at least one of the longitudinal sides of the elongated annulus is thicker at one end than the other.

10. A flexible joint in accordance with claim 8 in which the resilient material uniformly tapers from the thick end to the thin end.

11. A flexible joint in accordance with claim 8 in which the resilient material of both longitudinal sides of the elongated annulus is thicker at one end of the joint than the other and tapers uniformly from the thick end to the thin end, the taper of the resilient material of the two sides of the elongated annulus being in opposite directions.

12. A flexible joint comprising a body of resilient material, a pair of members having opposing faces between which said body of resilient material is positioned, at least one of said members being movable with respect to the other so that said opposing faces relatively approach each other and recede with a non-rectilinear movement, said body of resilient material being tapered in a direction such that those surfaces of the resilient material which are in contact with the opposing faces of said members are not parallel thereby to gradually absorb the shocks when there is a relative movement between the members, the opposing faces of said members and the faces of the resilient material which are in contact with such opposing faces of the members being free from interengaging projections and recesses such as would prevent longitudinal flow of the resilient material.

13. A flexible joint comprising a body of resilient material having an opening, a metal member for receiving the outer edge portion of the resilient material and a metal member for receiving the inner edge portion of the resilient material, at least one of said members being composite and having one portion which telescopes at least partly within another portion.

14. A flexible joint in accordance with claim 13 in which the inner member is composite and is made of sheet metal and comprises a ring-like portion engaging the inner face of the resilient material and another cup-like portion telescoping within said ring-like portion and secured thereto.

15. A flexible joint in accordance with claim 13 in which the body of resilient material is non-circular and the inner and outer members are non-circular, the inner member being composite and being made of sheet metal and comprises one portion adjacent the inner face of the resilient material and another cup-like portion telescoping within said first named portion.

16. A flexible joint comprising a body of resilient material having an opening, a metal member engaging the outer edge portion of the resilient material and a metal member engaging the inner portion of the resilient material, said last named member forming an annular channel in which the inner edge portion of the resilient material is received and gripped, one of the side flanges of said channel being formed separately from the remainder of the channel structure but being rigidly attached thereto.

17. A flexible joint comprising an elongated annulus of resilient material, an outer member engaging the outer edge portion of the resilient material, an inner member engaging the inner portion of the resilient material, and an element rigidly associated with one of said members and extending beyond the center of the joint in the direction of one of the radii of the annulus whereby a load may be supported by said element at a distance from the center of the joint.

18. A flexible joint comprising an inner rigid member and an outer rigid member, the space between the opposing faces of said members having the shape of an elongated annulus, and an elongated annulus of resilient material positioned in said space, at least one of said members having an annular channel for receiving and gripping the corresponding edge portion of the resilient material.

In testimony whereof I affix my signature.

GERHARD FLINTERMANN.